(12) United States Patent
Shi et al.

(10) Patent No.: US 10,249,210 B2
(45) Date of Patent: Apr. 2, 2019

(54) SYSTEM AND METHOD FOR PITCH CORRECTION

(71) Applicants: Zheng Shi, Beijing (CN); Xin Wang, Beijing (CN)

(72) Inventors: Zheng Shi, Beijing (CN); Xin Wang, Beijing (CN)

( * ) Notice: Subject to any disclaimer, the term of this patent is extended or adjusted under 35 U.S.C. 154(b) by 0 days.

(21) Appl. No.: 16/027,393

(22) Filed: Jul. 5, 2018

(65) Prior Publication Data
US 2018/0315333 A1   Nov. 1, 2018

Related U.S. Application Data

(63) Continuation-in-part of application No. PCT/CN2017/070499, filed on Jan. 6, 2017.

(30) Foreign Application Priority Data

Jan. 6, 2016 (CN) .......................... 2016 1 007283

(51) Int. Cl.
*G09B 15/00* (2006.01)
*G09B 15/02* (2006.01)
(Continued)

(52) U.S. Cl.
CPC .......... *G09B 15/023* (2013.01); *G09B 15/00* (2013.01); *G09B 21/009* (2013.01);
(Continued)

(58) Field of Classification Search
CPC .... G09B 15/023; G09B 15/00; G09B 21/009; G10H 1/0008; G10H 2210/066
(Continued)

(56) References Cited

U.S. PATENT DOCUMENTS

| 4,321,853 A | 3/1982 | Tumblin |
| 5,427,011 A | 6/1995 | Steinberger |

(Continued)

FOREIGN PATENT DOCUMENTS

| CN | 2058516 | 6/1990 |
| CN | 102194348 | 9/2011 |
| CN | 203225032 | 10/2013 |

OTHER PUBLICATIONS

SIPO: International Search Report for PCT Application No. PCT/CN2017/070499 filed Jan. 6, 2017, dated Apr. 1, 2017.

*Primary Examiner* — David Warren

(57) ABSTRACT

The present invention provides a system for pitch correction. The interactive surface is embedded with a host, an antenna, a memory unit, a voice input device, an audio recognition device, and a media player. The function of each light-emitting contact point is determined or changed by the host in accordance with preset programs. Each physical sheet is embedded with an RFID tag and is printed with a set of pitch marks with increasing difficulty levels, and the location of a functioning area on a physical sheet for the light-emitting contact points is determined in accordance with the preset programs, and the light-emitting contact points correspond to the location of the functioning area. Once a physical sheet is placed on the interactive surface, the host assigns preset flashing rules to the array of light-emitting contact points in accordance with the preset programs as well as the RFID tag embedded in the physical sheet, and generates a preset flashing pattern on the physical sheet, and activates touch functions of the corresponding light-emitting contact points. The visible feedback provides users a straightforward understanding how much their voices deviate from the reference pitches.

10 Claims, 2 Drawing Sheets

(51) Int. Cl.
  *G09B 21/00* (2006.01)
  *G10H 1/00* (2006.01)
(52) U.S. Cl.
  CPC ..... *G10H 1/0008* (2013.01); *G10H 2210/066* (2013.01); *G10H 2210/076* (2013.01); *G10H 2210/081* (2013.01); *G10H 2220/096* (2013.01)
(58) Field of Classification Search
  USPC .................................................. 84/622, 659
  See application file for complete search history.

(56) References Cited

U.S. PATENT DOCUMENTS

| | | | | |
|---|---|---|---|---|
| 9,183,755 | B2 * | 11/2015 | Shi | G09B 15/023 |
| 9,266,031 | B2 * | 2/2016 | Suh, II | A63H 33/042 |
| 9,728,099 | B2 * | 8/2017 | Armstrong | G09B 15/023 |
| 10,102,836 | B2 * | 10/2018 | Mintz | A63F 1/00 |
| 2005/0268773 | A1 | 12/2005 | Miller | |
| 2006/0076733 | A1 * | 4/2006 | Ritchie | A63F 3/00119 |
| | | | | 273/242 |
| 2006/0291212 | A1 * | 12/2006 | Forsman | G10H 1/0016 |
| | | | | 362/276 |
| 2009/0058002 | A1 * | 3/2009 | Hou | A63F 9/06 |
| | | | | 273/156 |
| 2009/0079833 | A1 * | 3/2009 | Abraham | G10H 1/0008 |
| | | | | 348/169 |
| 2009/0254206 | A1 * | 10/2009 | Snowdon | G10H 1/0025 |
| | | | | 700/94 |
| 2009/0293704 | A1 * | 12/2009 | Neil | G09B 15/002 |
| | | | | 84/471 R |
| 2009/0315257 | A1 * | 12/2009 | Blumenstock | A63F 1/04 |
| | | | | 273/237 |
| 2010/0004062 | A1 * | 1/2010 | Maharbiz | A63F 3/00643 |
| | | | | 463/36 |
| 2011/0252946 | A1 * | 10/2011 | Armstrong | G09B 15/023 |
| | | | | 84/483.2 |
| 2013/0011111 | A1 * | 1/2013 | Abraham | G10H 1/0008 |
| | | | | 386/200 |
| 2013/0022211 | A1 * | 1/2013 | Schild | G10H 1/0083 |
| | | | | 381/61 |
| 2015/0068387 | A1 * | 3/2015 | Shi | G09B 15/023 |
| | | | | 84/471 R |
| 2015/0068391 | A1 * | 3/2015 | Friesen | G10H 1/06 |
| | | | | 84/701 |
| 2015/0072586 | A1 * | 3/2015 | Suh, II | A63H 33/042 |
| | | | | 446/91 |
| 2015/0095883 | A1 * | 4/2015 | Shi | G06F 3/048 |
| | | | | 717/109 |
| 2017/0018202 | A1 * | 1/2017 | Marradi | G09B 15/08 |
| 2017/0186411 | A1 * | 6/2017 | Mintz | A63F 1/00 |
| 2017/0337840 | A1 * | 11/2017 | Armstrong | G09B 15/023 |
| 2018/0082606 | A1 * | 3/2018 | Jones | G09B 15/023 |
| 2018/0293414 | A1 * | 10/2018 | Shi | G06F 3/002 |
| 2018/0315333 | A1 * | 11/2018 | Shi | G09B 15/023 |
| 2018/0315334 | A1 * | 11/2018 | Shi | G09B 15/023 |

* cited by examiner

SYSTEM AND METHOD FOR PITCH CORRECTION

CROSS-REFERENCE TO RELATED APPLICATION

This application is a continuation in part of International Patent Application No. PCT/CN2017/070499, entitled "System and Method for Pitch Correction", filed on Jan. 6, 2017, which claims priority of Patent Application CN2016100072831, entitled "Apparatus for Pitch Correction", filed on Jan. 6, 2016. The entire disclosure of the above application is incorporated herein by reference.

TECHNICAL FIELD

The present invention relates to an electronic teaching aid designed to help people on pitch correction.

BACKGROUND

In order to correct pitches for students, particularly those who suffer from tone deafness, music teachers usually provide one-on-one instructions according to traditional teaching methods, which demands a great deal of manpower. Thus, it is desirable to develop a new way of pitch correction which doesn't rely on manpower so much.

SUMMARY OF THE INVENTION

Aiming to solve the problems above, the present invention provides an interactive system and the accompanying method for pitch correction.

In accordance with one embodiment of the present invention, the system includes an interactive surface, an array of light-emitting contact points on the interactive surface, and multiple physical sheets. The interactive surface is embedded with a host, an antenna, a memory unit, a voice input device, an audio recognition device, and a media player. The function of each light-emitting contact point is determined or changed by the host in accordance with preset programs. Each physical sheet is embedded with an RFID tag and is printed with a set of pitch marks with increasing difficulty levels, and the location of a functioning area on a physical sheet for the light-emitting contact points is determined in accordance with the preset programs, and the light-emitting contact points correspond to the location of the functioning area. Once a physical sheet is placed on the interactive surface, the host assigns preset flashing rules to the array of light-emitting contact points in accordance with the preset programs as well as the RFID tag embedded in the physical sheet, and generates a preset flashing pattern on the physical sheet, and activates touch functions of the corresponding light-emitting contact points.

In accordance with one embodiment of the present invention, the memory unit stores multiple sets of music theory teaching rules, and each set of the music theory teaching rules corresponds to one set of pitch marks with increasing difficulty levels. The memory unit also stores multiple sets of distributing schemes for flashing rules of the light-emitting contact points and assigning rules for the touch functions. Each set of music theory teaching rules corresponds to one set of distributing schemes.

In accordance with one embodiment of the present invention, the light-emitting contact points are assigned with musical scale and timbre of a keyboard musical instrument in accordance with one set of distributing scheme.

In accordance with one embodiment of the present invention, the light-emitting contact points are assigned as a display device in accordance with one set of distributing scheme. The voice input device collects audio information, the host compares the audio information with preset pitches, and the display device displays the computed result of the comparison.

In accordance with one embodiment of the present invention, the pitch mark is used to mark one or more musical elements that might be beat, beat density, tempo, pitch interval, range, or tonality.

With the system above, users can help themselves for pitch correction without asking much help from tutors.

BRIEF DESCRIPTION OF THE DRAWINGS

To better illustrate the technical features of the embodiments of the present invention, various embodiments of the present invention will be briefly described in conjunction with the accompanying drawings. It should be obvious that the drawings are only for exemplary embodiments of the present invention, and that a person of ordinary skill in the art may derive additional drawings without deviating from the principles of the present invention.

DETAILED DESCRIPTION OF THE INVENTION

To better illustrate the purpose, technical feature, and advantages of the embodiments of the present invention, various embodiments of the present invention will be further described in conjunction with the accompanying drawings.

While the present invention will be described in connection with various specific embodiments, the invention is not limited to these embodiments. People skilled in the art will recognize that the system and method of the present invention may be used in many other applications. The present invention is intended to cover all alternatives, modifications and equivalents within the spirit and scope of invention, which is defined by the apprehended claims.

The technical scheme in the embodiments of the present invention will be described clearly and completely by reference to the accompanying drawings.

Figure 1:
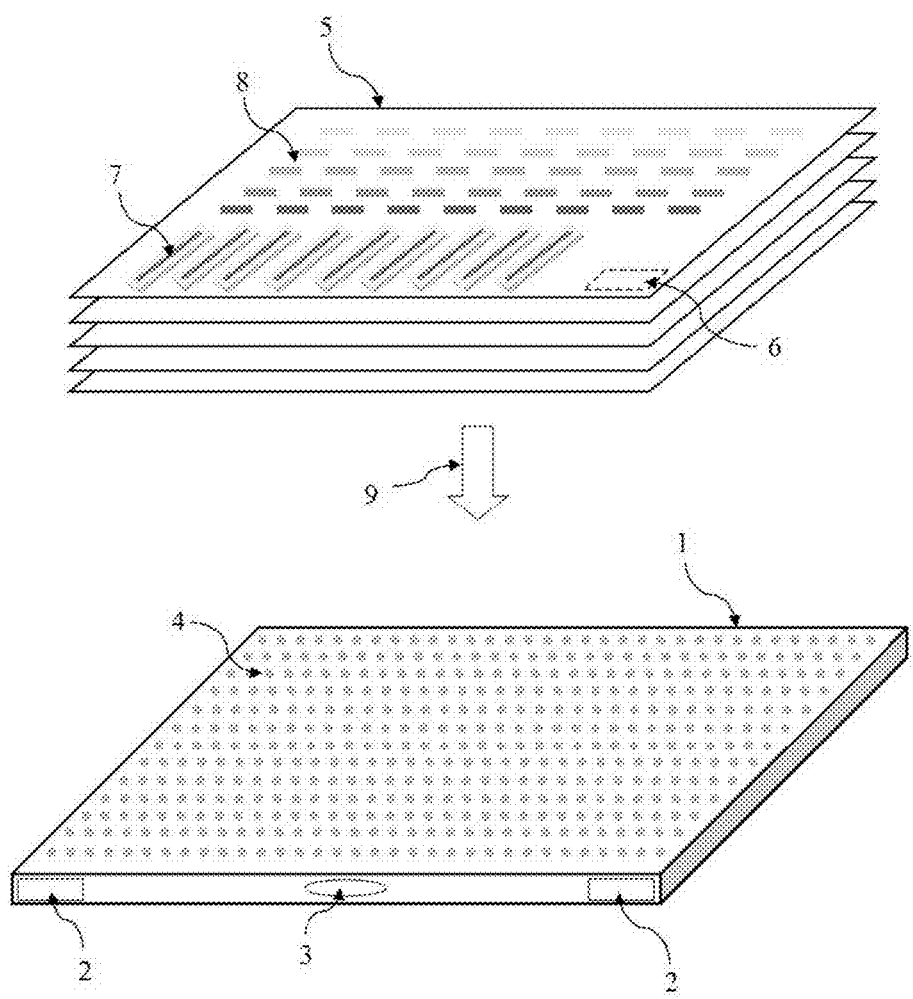
FIG. 1 is a schematic diagram illustrating the structure of the system for pitch correction in accordance with one embodiment of the present invention.

The present invention introduces a system for pitch correction, as shown in FIG. 1. The system includes an interactive surface 1, which is embedded with a host, an antenna, a memory unit, a voice input device 3 (a microphone in FIG. 2), an audio recognition device, and a media player 2. There is an array of light-emitting contact points 4 on the interactive surface 1. The function of each contact point 4 is determined or changed by the host in accordance with preset programs. And in this embodiment, the light-emitting contact points 4 are light-emitting diodes (LED) that can be pressed by fingers.

The system further includes multiple semi-transparent physical sheets 5 that can be placed on the interactive surface 1 separately. Each physical sheet 5 is embedded with an RFID tag 6 and printed with a set of pitch marks 8 with increasing difficulty levels. The location of a functioning area on a physical sheet 5 for the light-emitting contact points 4 is determined in accordance with the preset programs, which makes the light-emitting contact points 4 correspond to the location of the functioning area on the physical sheet 5.

Once a physical sheet 5 is placed on the interactive surface 1, the host assigns preset flashing rules to the array of light-emitting contact points 4 in accordance with the preset programs as well as the RFID tag embedded in the physical sheet, and thus generates a preset flashing pattern on the physical sheet 5, and also activates touch functions for another portion of the light-emitting contact points 4.

The memory unit stores multiple sets of music theory teaching rules and multiple data packets of pitches. Each set of the music theory teaching rules corresponds to one set of pitch marks 8 with increasing difficulty levels. In detail, each physical sheet may marks different difficulty levels, different touch functions and different dynamically flashing patterns with different designs. The memory unit also stores multiple sets of distributing schemes for flashing rules of the light-emitting contact points 4 and assigning rules for the touch functions. And each set of music theory teaching rules corresponds to one set of distributing schemes.

As per one set of the distributing schemes, a group of light-emitting contact points 4 are assigned with musical scale and timbre of a keyboard musical instrument, and are represented by a set of keys 7 on the physical sheet 5. Another group of light-emitting contact points 4 are assigned as a display device, and are represented by patterns such as stave, waves and bars on the physical sheet 5, to stand for the pitch marks 8 on the physical sheet 5. The voice input device 3 collects audio information that will be compared with preset pitches later by the host, and the computed result of the comparison is displayed in the form of pitch marks 8 on the physical sheet 5, as shown in FIG. 1.

Each physical sheet 5 corresponds to pitch marks 8 with increasing difficulty levels. The pitch marks 8 are used to mark the musical elements such as beat, beat density, tempo, pitch interval, range, or tonality.

Figure 2:
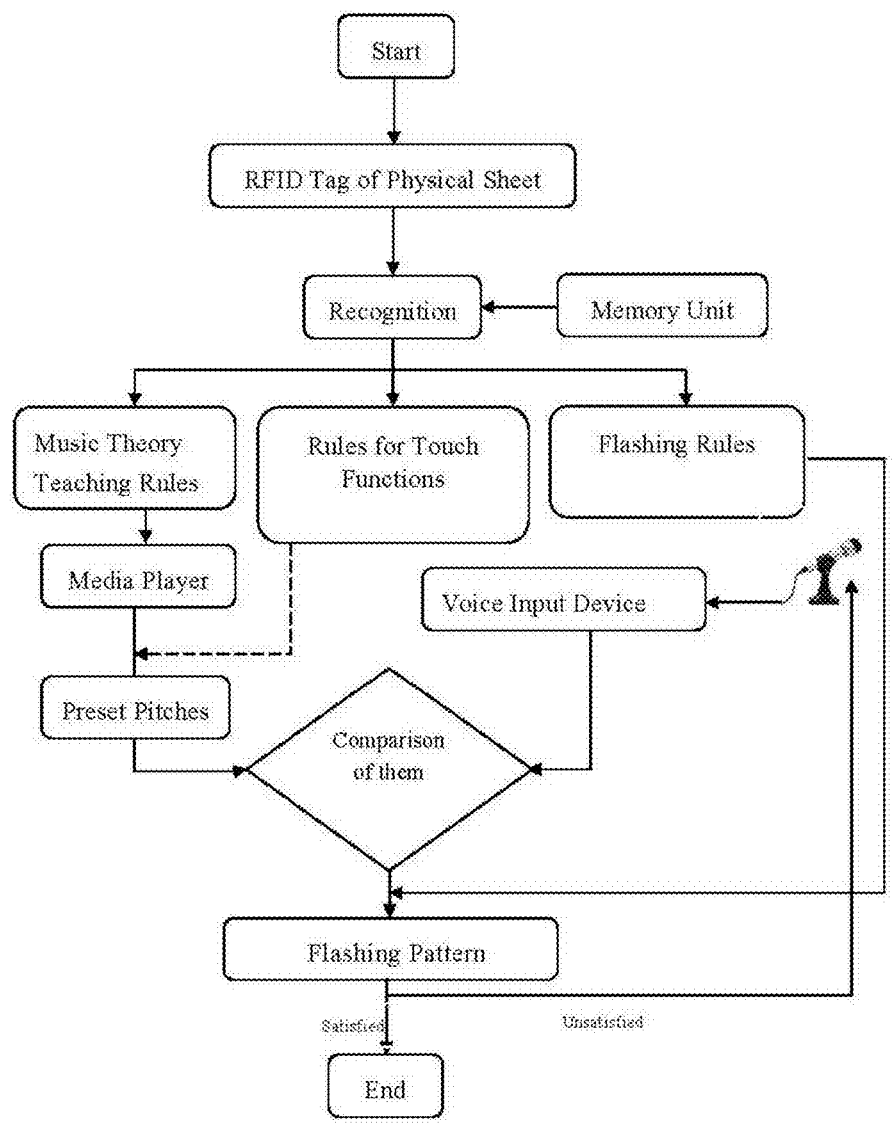
FIG. 2 is a schematic diagram illustrating the process flow of the system for pitch correction in accordance with one embodiment of the present invention.

FIG. 2 is a schematic diagram illustrating the process flow of the system for pitch correction in accordance with one embodiment of the present invention. The detail is as follows:

Step 1: placing a physical sheet 5 on the interactive surface 1 after the system for pitch correction is started, as indicated by the arrow 9 in FIG. 1.

Step 2: reading the RFID tag 6 and transmitting the ID information of the physical sheet 5 to the host, by the RF antenna.

Step 3: extracting the preset rules, which include distributing schemes for flashing rules of the light-emitting contact points 4, distributing schemes for assigning rules of the touch functions to the light-emitting contact points 4 and the activation rules of the light-emitting contact points 4, the music theory teaching rules corresponding to the physical sheet 5, by the host; the touch functions of the light-emitting contact points 4 can be assigned to timbre of any musical instrument and the functional components of the musical instrument such as keys and strings, in accordance with the preset programs and the corresponding MIDI files.

Step 4: playing preset reference pitches by the media player 2 or by the light-emitting contact points 4 already assigned with the touch functions, according to the preset music theory teaching rules; the dash lines in FIG. 2 mean that touching the keys, i.e., touching the light-emitting contact points 4 covered by the physical sheet 5, is an optional way of playing the preset reference pitches; the pitches can also be played by the media player 2.

Step 5: repeating the reference pitches played in step 4 by a user, through the microphone shown in FIG. 2, as instructed by the preset music theory teaching rules.

Step 6: receiving the human voice of the user by a voice input device 3, recognizing and analyzing the audio information by the audio recognition device, and obtaining the frequency of the human voice.

Step 7: comparing the frequency of the human voice of the user with the frequency of the preset pitch in real time.

Step 8: exporting the result of the comparison made in step 7 dynamically with flashing patterns generated by the light-emitting contact points 4, in accordance with the preset distributing schemes for the flashing rules of the light-emitting contact points 4; accordingly, the flashing patterns are presented by the pitch marks 8 on the physical sheet 5.

The output of the result of the comparison made in step 7 can be provided with visible feedback, such as a dynamic pattern of scores, cheers, and boos. Users may make corrections on their pitches according to the visible feedback, and repeat step 5 until being satisfied.

The invention claimed is:

1. A system for pitch correction, comprising:
an interactive surface embedded with a host, an antenna, a memory unit, a voice input device, an audio recognition device, and a media player;
an array of light-emitting contact points on the interactive surface, wherein the function of each of the light-emitting contact points is determined or changed by the host in accordance with preset programs;
a plurality of physical sheets, wherein each of the physical sheets is embedded with an RFID tag and is printed with a set of pitch marks with increasing difficulty levels, and wherein the location of a functioning area on a physical sheet for the light-emitting contact points is determined in accordance with the preset programs, and wherein the light-emitting contact points correspond to the location of the functioning area;
wherein, upon a physical sheet being placed on the interactive surface, the host is configured to assign preset flashing rules to the array of light-emitting contact points in accordance with the preset programs and the RFID tag embedded in the physical sheet, and to generate a preset flashing pattern on the physical sheet, and to activate touch functions of the corresponding light-emitting contact points.

2. The system of claim 1, wherein
the memory unit is configured to store a plurality of sets of music theory teaching rules, and each set of the music theory teaching rules corresponds to one set of pitch marks with increasing difficulty levels;
the memory unit is configured to store a plurality of sets of distributing schemes for flashing rules of the light-emitting contact points and assigning rules for the touch functions; and
each set of music theory teaching rules corresponds to one set of distributing schemes.

3. The system of claim 2, wherein the light-emitting contact points are assigned with musical scale and timbre of a keyboard musical instrument in accordance with one set of distributing scheme.

4. The system of claim 2, wherein
the light-emitting contact points are assigned as a display device in accordance with one set of distributing scheme; and
the voice input device is configured to collect audio information, and the host is configured to compare the audio information with preset pitches, and the display device is configured to display the computed result of the comparison.

5. The system of claim 1, wherein the pitch mark is used to mark one or more musical elements selected from a group consisting of beat, beat density, tempo, pitch interval, range, and tonality.

6. A method for pitch correction, comprising:
placing a physical sheet on a an interactive surface, wherein the interactive surface is embedded with a host, an antenna, a memory unit, a voice input device, an audio recognition device, and a media player, and wherein an array of light-emitting contact points is placed on the interactive surface and the function of each of the light-emitting contact points is determined or changed by the host in accordance with preset programs, and wherein the physical sheet is embedded with an RFID tag and printed with a set of pitch marks with increasing difficulty levels, and wherein and wherein the location of a functioning area on a physical sheet for the light-emitting contact points is determined in accordance with the preset programs, and wherein the light-emitting contact points correspond to the location of the functioning area;
reading the RFID tag and transmitting the ID information of the physical sheet to the host by the antenna;
assigning preset flashing rules to the array of light-emitting contact points in accordance with the preset programs and the RFID tag embedded in the physical sheet, generating a preset flashing pattern on the physical sheet, and activating touch functions of the corresponding light-emitting contact points, by the host.

7. The method of claim 6, wherein
the memory unit is configured to store a plurality of sets of music theory teaching rules, and each set of the music theory teaching rules corresponds to one set of pitch marks with increasing difficulty levels;
the memory unit is configured to store a plurality of sets of distributing schemes for flashing rules of the light-emitting contact points and assigning rules for the touch functions; and
each set of music theory teaching rules corresponds to one set of distributing schemes.

8. The method of claim 7, wherein the light-emitting contact points are assigned with musical scale and timbre of a keyboard musical instrument in accordance with one set of distributing scheme.

9. The method of claim 7, wherein
the light-emitting contact points are assigned as a display device in accordance with one set of distributing scheme; and
the voice input device is configured to collect audio information, and the host is configured to compare the audio information with preset pitches, and the display device is configured to display the computed result of the comparison.

10. The method of claim 6, wherein the pitch mark is used to mark one or more musical elements selected from a group consisting of beat, beat density, tempo, pitch interval, range, and tonality.

* * * * *